US006671613B2

(12) United States Patent
Stotsky et al.

(10) Patent No.: US 6,671,613 B2
(45) Date of Patent: Dec. 30, 2003

(54) CYLINDER FLOW CALCULATION SYSTEM

(75) Inventors: Alexander Anatoljevich Stotsky, Backa (SE); Ilya V. Kolmanovsky, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 10/161,918

(22) Filed: Jun. 4, 2002

(65) Prior Publication Data

US 2002/0198649 A1 Dec. 26, 2002

Related U.S. Application Data

(63) Continuation-in-part of application No. 09/769,800, filed on Jan. 25, 2001.

(51) Int. Cl.[7] .......................... G06F 19/00; F02D 41/18

(52) U.S. Cl. ...................... 701/113; 73/118.2; 701/104; 123/480; 123/491

(58) Field of Search ................................ 701/113, 104; 123/480, 491, 488, 486; 73/116, 117.3, 118.2

(56) References Cited

U.S. PATENT DOCUMENTS 4,644,474 A 2/1987 Aposchanski et al.
4,773,375 A 9/1988 Okino et al.
5,008,824 A 4/1991 Clark et al.
5,050,560 A 9/1991 Plapp
5,215,062 A * 6/1993 Asano et al. ............... 123/491
5,497,329 A * 3/1996 Tang .......................... 701/104
6,373,144 B2 * 4/2002 Frohlich et al. .......... 290/40 R
2002/0133286 A1 * 9/2002 Kolmanovsky et al. ..... 701/104

FOREIGN PATENT DOCUMENTS

JP 05-240104 * 9/1993 ........... F02D/45/00

* cited by examiner

*Primary Examiner*—Hieu T. Vo
(74) *Attorney, Agent, or Firm*—Julia Voutyras; Allan J. Lippa

(57) ABSTRACT

An improved method for estimating cylinder flow in an internal combustion engine under all operating conditions is provided. If the MAF sensor is not operational, an estimation algorithm that is independent of a measured throttle flow is used. If the MAF sensor is operational, an estimation algorithm that incorporates a measured throttle flow is used. Further, in order to eliminate abrupt fluctuations that may occur due to switching between two different types of estimates, a "switchover coordinator" algorithm is used to smoothly transition from one type of estimate to another.

30 Claims, 3 Drawing Sheets

CYLINDER FLOW CALCULATION SYSTEM

CROSS-REFERENCE TO RELATED APPLICATIONS

This application is a continuation-in-part of co-pending U.S. patent application Ser. No. 09/769,800 entitled "Method and system for engine air-charge estimation", filed on Jan. 25, 2001, the entire subject matter thereof is being incorporated herein by reference.

FIELD OF INVENTION

The present invention relates to a system and a method for controlling an internal combustion engine.

BACKGROUND OF THE INVENTION

In order to efficiently operate an internal combustion engine, it is important to achieve good control of the air-fuel ratio. This can be accomplished by determining the cylinder flow and adjusting the amount of fuel to be injected accordingly to achieve a desired air-fuel ratio. Therefore, it is important to obtain an accurate estimate of the cylinder flow. One method is described in a pending U.S. application Ser. No. 09/769,800 owned by the assignee of the present invention and incorporated herein by reference, which teaches an estimation algorithm for determining engine cylinder flow using both an airflow sensor (MAF) and an intake manifold pressure (MAP) sensor. This MAP-MAF estimation algorithm uses the information on the time rate of change of the intake manifold pressure signal to correctly estimate cylinder flow during transients, and precisely matches the MAF sensor measurement at steady state.

However, under some circumstances the MAF sensor reading may become less accurate, thus negatively affecting the overall accuracy of the cylinder flow estimate. For example, in systems where a hot wire-type MAF sensor is used, the sensor does not reach operating temperature immediately upon start-up of the engine. Therefore, it is possible for the MAF sensor reading to not be accurate for the first 30–60 seconds of engine operation. Additionally, at high throttle angles, pulsation and backflow may affect the accuracy of the MAF sensor reading. Therefore, under the circumstances where MAF sensor reading accuracy is reduced, other methods of estimating cylinder flow that are not dependent on the MAF sensor reading are required. One such system is described in U.S. Pat. No. 4,644,474 owned by the assignee of the present invention, wherein engine operating conditions are monitored to determine when to switch between the MAF sensor reading and the estimate of the airflow based on the speed-density equation.

While this system provides satisfactory results, the inventors herein have recognized that an improved performance can be achieved. Specifically, since there is always some difference between an estimated and an actual reading, or between two different types of estimates, switching between them may cause abrupt fluctuations in the air-fuel ratio and engine torque, thus degrading vehicle drivability, fuel economy, and emission control.

SUMMARY OF THE INVENTION

The present invention teaches a method for accurately estimating cylinder flow under all operating conditions while eliminating any fluctuations that may result due to switching between different types of estimates.

In accordance with the present invention, a method and system for estimating cylinder flow in an internal combustion engine include: calculating a first cylinder flow estimate based on a first algorithm; providing an indication of an operating condition; in response to said indication, calculating a second cylinder flow estimate based on a second algorithm; and adjusting said second cylinder flow estimate based on said first cylinder flow estimate for a predetermined period of time thereby providing a smooth transition between said first estimate and said second estimate.

An advantage of the present invention is that a more accurate method of estimating cylinder flow is achieved during all operating conditions, therefore resulting in improved air-fuel ratio control, and thus improved fuel economy, emission control and vehicle drivability.

Another advantage of the present invention is that it results in a smooth transition between the two types of estimates, and therefore eliminates abrupt torque fluctuations and improves driver satisfaction.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such as conventional engines in addition to direct injection stratified charge (DISC) or direct injection spark ignition engines (DISI).

Figure 1:
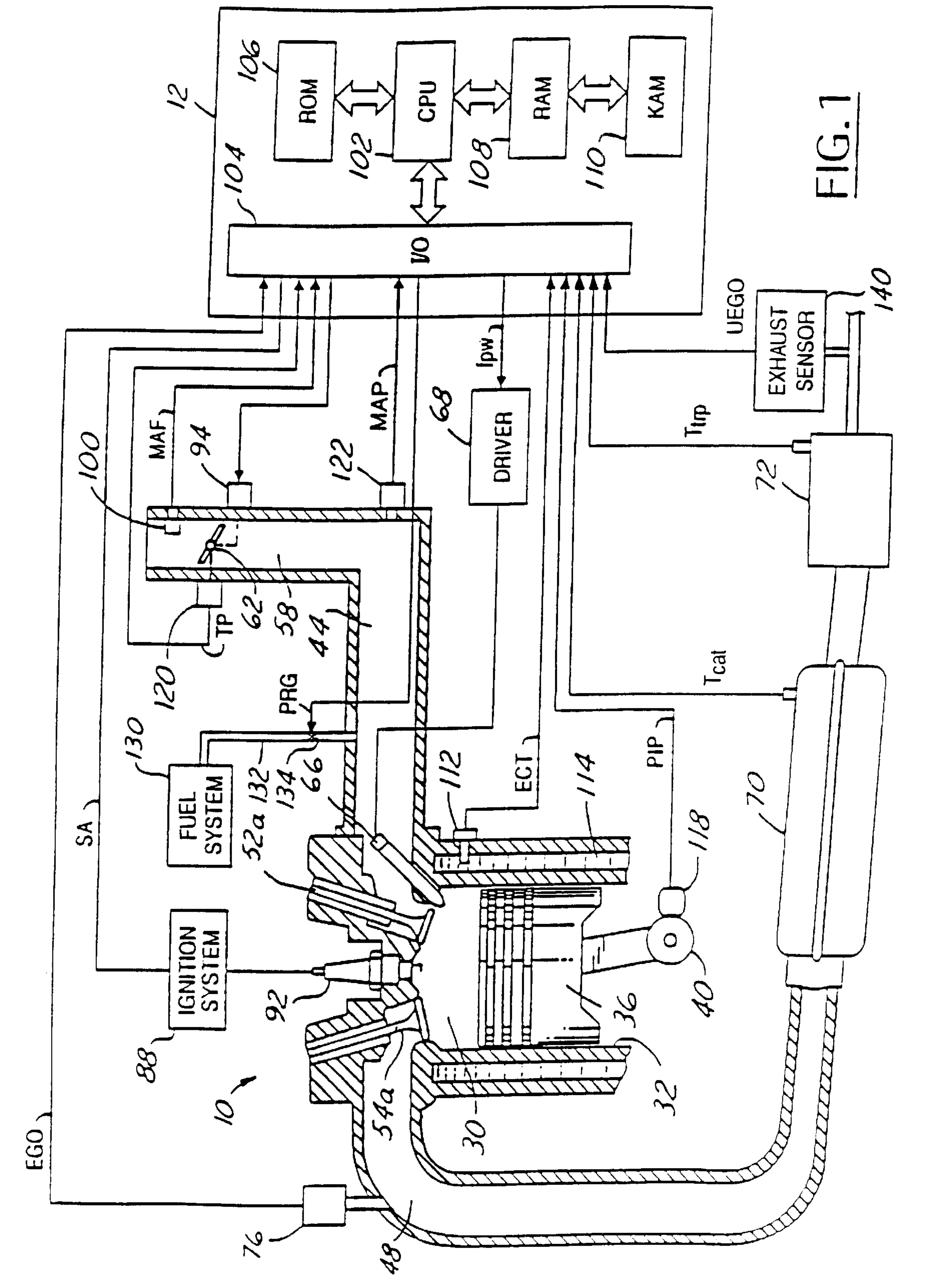
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In addition, the combustion chamber 30 is shown communicating with intake manifold 44 and exhaust manifold 48 via respective intake valves 52*a* and 52*b* (not shown), and exhaust valves 54*a* and 54*b* (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio.

Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases.

Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures.

In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx trap 72 is shown positioned downstream of catalytic converter 70. Both devices store exhaust gas components, such as NOx, when engine 10 is operating lean of stoichiometry. These are subsequently reacted with HC, CO and other reductant and are catalyzed during a purge cycle when controller 12 causes engine 10 to operate in either a rich mode or a near stoichiometric mode.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

Figure 2:
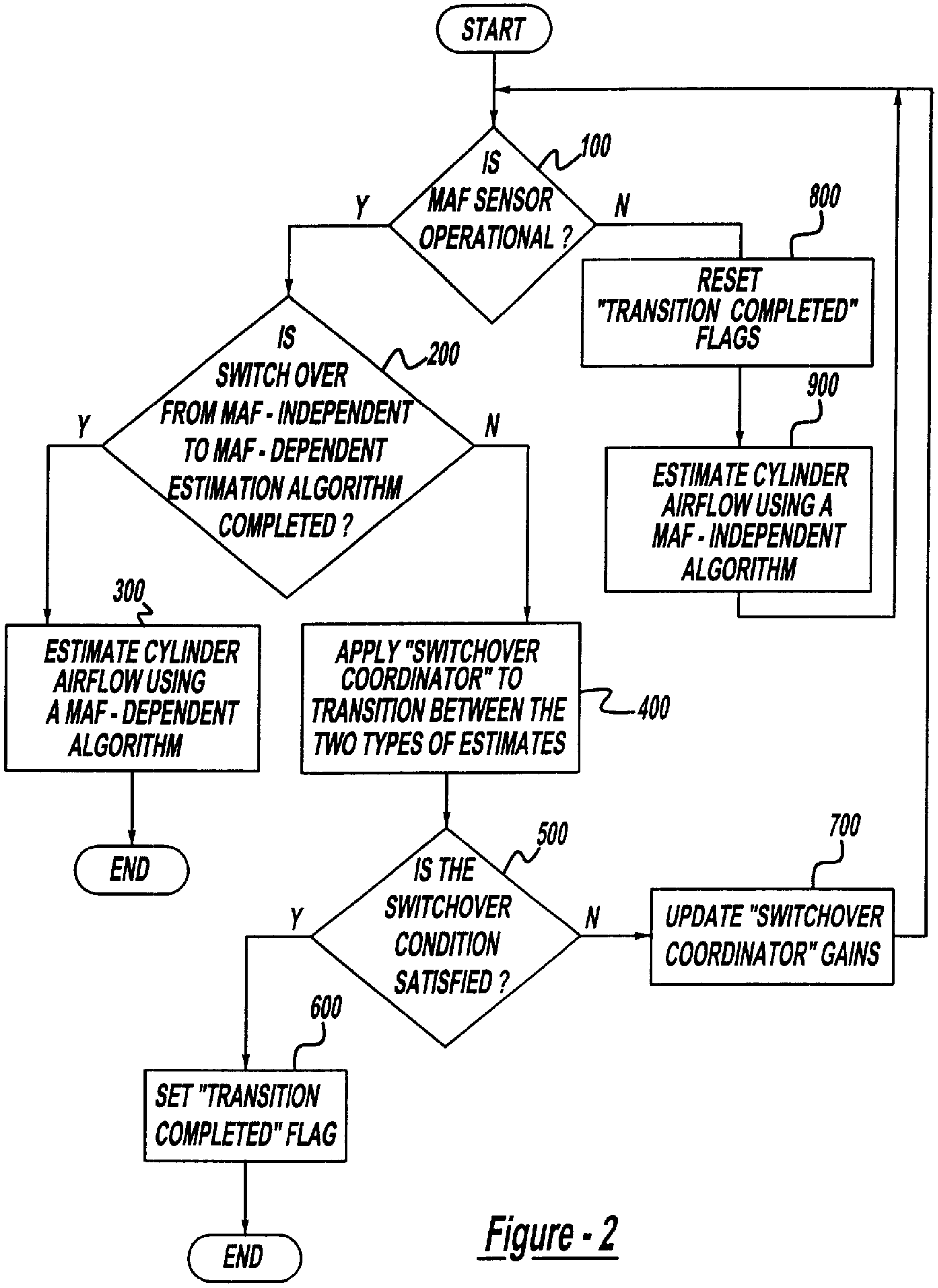
FIG. 2 is a block diagram of an example of an embodiment in which the invention is used to advantage.

The diagram in FIG. 2 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 2, a routine is described for selecting between a MAF-independent and a MAF-dependent cylinder flow estimate based on operating conditions, and for facilitating a smooth transition between the two types of estimates via the "switchover coordinator".

First in step 100, a determination is made whether the mass airflow (MAF) sensor is operational. For example, MAF sensor may not be operational and therefore not provide accurate readings when its temperature is below a predetermined temperature, such as at engine startup. Under these circumstances, time since engine start can be monitored and compared to a predetermined constant to make the decision in step 100. Alternatively, throttle position sensor signal may be monitored in step 100 to determine whether the MAF sensor is operational or not, since MAF sensor accuracy decreases at high throttle angles due to air pulsation and backflow.

If the answer to step 100 is NO, indicating that the MAF sensor is not operational, the routine proceeds to step 800 wherein a "transition completed" flag is set to 0. The routine then proceeds to step 900 wherein cylinder flow is estimated without relying on the information supplied by the MAF sensor. For example, cylinder flow can be estimated using the speed-density equation:

$$W_{cyl} = \eta_{vk}\frac{n_e}{2}V_d\frac{P}{RT}$$

where $\eta_{vk}$ is a volumetric efficiency estimated from a nominal map as a function of engine speed and valve timing, $V_d$ is the engine displacement volume (a predetermined constant), P is the intake manifold pressure measured by the MAP sensor, T is the intake manifold temperature either measured by a senor or estimated, R is a gas constant (difference of specific heats), $n_e$ is the engine speed in revolutions per second. The routine then returns to step 100.

If the answer to step 100 is YES, the routine proceeds to step 200 wherein a determination is made whether the transition between the two types of cylinder flow estimates is completed. If the answer to step 200 is YES, the routine proceeds to step 300, wherein cylinder flow is estimated using MAF sensor information:

$$W_{cyl} = \eta_{vk}\frac{n_e}{2}V_d\frac{P}{RT} + (\varepsilon - \gamma P)\frac{V_{im}}{RT}$$

where $\eta_{vk}$ is a volumetric efficiency estimated from a nominal map as a function of engine speed and valve timing, $V_d$ is the engine displacement volume (a predetermined constant), P is the intake manifold pressure measured by the MAP sensor, T is the intake manifold temperature measured by a senor or estimated, R is a gas constant (difference of specific heats), $n_e$ is the engine speed in revolutions per second, $V_{im}$ is the intake manifold volume, $\gamma$ is the estimator gain, and $\epsilon$ is the estimator state. The estimator state is updated in accordance with the following equation:

$$\varepsilon(t+\Delta) = \varepsilon(t) + \Delta\Big(-\gamma\varepsilon(t) - \gamma\eta_{vk}(t)\frac{n_e(t)}{2}V_d\frac{P(t)}{V_{im}} + \gamma\frac{RT(t)}{V_{im}}W_{th}(t) + \gamma^2P(t) + \gamma\frac{RT(t)}{V_{im}}W_{egr}(t)\Big)$$

where $W_{th}$ is the mass flow rate through the throttle as measured by the MAF sensor, and $\Delta$ is the sampling period, and $W_{egr}$ is an estimate of an amount of recirculated exhaust gas inducted into the intake manifold. The routine then exits.

If the answer to step 200 is NO, indicating that even though MAF sensor is operational, the transition between the MAF-independent and MAF-dependent estimates is still in process, the routine proceeds to step 400 wherein the "switchover coordinator" algorithm is employed to achieve a smooth transition between the two different estimates according to the following equation:

$$y(t+\Delta)=y(t)+\Delta\cdot(-\gamma_1(y(t)-x(t))-\gamma_2(y(t)-z(t))-\gamma_3\text{sign}(y(t)-z(t)))$$

where $\gamma_1$, $\gamma_2$ and $\gamma_3$ are nonnegative gains, x(t) is a first type of cylinder flow estimate and z(t) is a second type of estimate. The initial time t=0 coincides with the start of the transition between the two types of estimates.

The routine then proceeds to step 500 wherein a determination is made whether the switchover condition has been satisfied. The switchover condition is satisfied when the difference between the two types of estimates is less than a small predetermined value, e. For example, the condition that may be satisfied at the time instant t when:

$$(z(t)-y(t))\cdot(z(t-1)-y(t-1))<e$$

If the answer to step 500 is YES, which means that y(t) has crossed z(t), the routine proceeds to step 600 wherein a the "transition completed" flag is set to 1, and the routine ends. If the answer to step 500 is NO, indicating that the transition is not completed yet, the routine proceeds to step 700 wherein the "switchover coordinator" gains are updated according to the following equation:

$$\gamma_1(t+\Delta)=\gamma_1(t)-\Delta\cdot\alpha\cdot\gamma_1$$

$$\gamma_2(t+\Delta)=\gamma_2(t)-\Delta\cdot\alpha\cdot(\gamma_2-\gamma_{20})$$

$$\gamma_3(t+\Delta)=\gamma_3(t)-\Delta\cdot\alpha\cdot(\gamma_3-\gamma_{30})$$

where the constants and initial conditions are set so that they satisfy $$\gamma_1(0)>0$$

$$\gamma_{20}>0,\ \gamma_2(0)=0$$

$$\gamma_{30}>0,\ \gamma_3(0)=0$$

The routine then cycles back to step 200.

Figure 3:
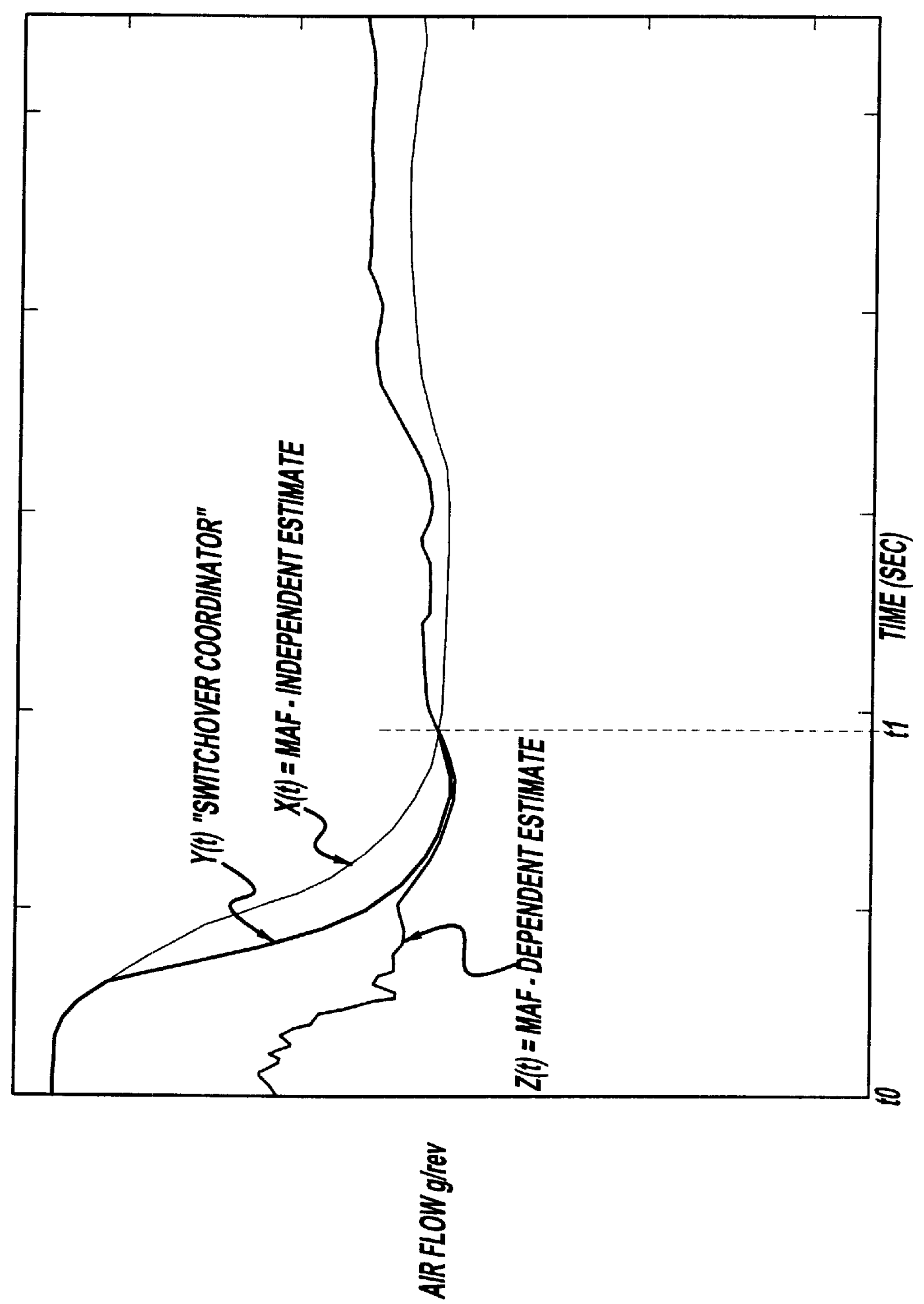
FIG. 3 is a graphic description of an example of a transition between the two types of flow estimates according to the present invention.

Referring now to FIG. 3, a graphical depiction of an example of how the "switchover coordinator" is employed to achieve a smooth transition between the two different estimation methods is presented. X(t) is a MAF-independent cylinder flow estimate plotted as a function of time, z(t) is a MAF-dependent estimate of the flow as a function of time, and y(t) is the output of the "switchover coordinator". Time $t_0$ corresponds to step 400 of the above-described FIG. 2, wherein the MAF sensor becomes operational and the transition between the two types of estimates begins. Time $t_1$ corresponds to step 600 of FIG. 2, wherein the switchover condition is satisfied when the output of the "switchover coordinator", y(t) crosses the MAP-MAF flow estimate z(t). Therefore, any control strategy that requires an estimate of cylinder flow (such as the air-fuel ratio control strategy, or an engine torque control strategy) can use the estimate depicted by the curve x(t) prior to time $t_0$, the estimate depicted by z(t) after time $t_1$, and the output of the "switchover coordinator" y(t) during the time period between $t_0$ and $t_1$. In this way, abrupt fluctuations in the air-fuel ratio or engine torque that may occur due to switching between the two types of estimates can be avoided.

Alternatively, the "switchover coordinator" can be used to smoothly transition between the cylinder flow estimate based on the estimated throttle flow and the one based on the throttle flow as measured by the MAF sensor. For example, the cylinder flow equation described above in step 300, FIG. 2, can be used:

$$W_{cyl} = \eta_{vk}\frac{n_e}{2}V_d\frac{P}{RT} + (\varepsilon - \gamma P)\frac{V_{im}}{RT}$$

where $\epsilon$ is updated in accordance with the following equation:

$$\varepsilon(t+\Delta) = \varepsilon(t) + \Delta\Big(-\gamma\varepsilon(t) - \gamma\eta_{vk}(t)\frac{n_e(t)}{2}V_d\frac{P(t)}{V_{im}} + \gamma\frac{RT(t)}{V_{im}}W_{th}(t) + \gamma^2 P(t) + \gamma\frac{RT(t)}{V_{im}}W_{egr}(t)\Big)$$

and $W_{th}$ is either the mass flow rate through the throttle as measured by the MAF sensor (when the MAF sensor is operational) or estimated via the orifice equation:

$$W_{th} = \frac{C_d A_{thr} P_b}{\sqrt{RT_b}}\theta$$

where $C_d$ is the orifice discharge coefficient, $A_{thr}$ is the throttle valve area which is a function of the throttle position, $T_b$ is the temperature upstream of the throttle (measured or estimated), R is a gas constant (difference of specific heats), $P_b$ is the ambient pressure before the throttle, and θ is a function of the ratio of the intake manifold pressure Pi and the ambient pressure before the throttle, $P_b$ defined by the following equations:

$$\left(\frac{P_i}{P_b}\right)^{1/r}\cdot\sqrt{\frac{2}{(r-1)}\cdot\left[1-\left(\frac{P_i}{P_b}\right)^{(r-1)/r}\right]};\ \left(\frac{P_i}{P_b}\right) > P_{crit}$$

$$\theta = \sqrt{\left(\frac{2}{(r+1)}\right)^{(r+1)/(r-1)}};\ \left(\frac{P_i}{P_b}\right) \le P_{crit}$$

where $P_{crit}$ is the critical pressure ratio of 0.5283, and r is a ratio of specific heats.

Therefore, it is possible to obtain an accurate estimate of cylinder flow at all operating conditions by using a MAF-independent estimate when MAF sensor is not operational (such as at engine start-up of at high throttle angles) and using a "switchover coordinator" to smoothly transition to a MAF-dependent cylinder flow estimate when the MAF sensor is operational. Using the "switchover coordinator" avoids abrupt jumps in cylinder flow estimates and thus eliminates resulting air-fuel ratio and torque fluctuations.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A system for estimating a cylinder flow in an internal combustion engine, comprising:

a mass airflow (MAF) sensor; and a controller for evaluating engine operating conditions, said controller providing a smooth transition between a MAF sensor-dependent cylinder flow estimation method and a MAF sensor-independent cylinder flow estimation method based on said operating conditions.

2. The system as set forth in claim 1, wherein said operating conditions comprise a time since engine start.

3. The system as set forth in claim 1 wherein said operating conditions comprise an intake manifold pressure.

4. The system as set forth in claim 1 wherein said operating conditions comprise a throttle position angle.

5. The system as set forth in claim 1 wherein said MAF sensor-dependent flow estimation method is based on the following equation:

$$W_{cyl} = \eta_{vk}\frac{n_e}{2}V_d\frac{P}{RT} + (\varepsilon - \gamma P)\frac{V_{im}}{RT}$$

where $\epsilon$ is adjusted as follows:

$$\dot{\varepsilon} = -\gamma\varepsilon - \gamma\eta_{vk}\frac{n_e}{2}V_d\frac{P}{V_{im}} + \gamma\frac{RT}{V_{im}}W_{th} + \gamma\frac{RT}{V_{im}}W_{egr} + \gamma^2 P.$$

6. The system as set forth in claim 1 wherein said MAF sensor-independent flow estimation method is based on the following equation:

$$W_{cyl} = \eta_{vk}\frac{n_e}{2}V_d\frac{P}{RT}.$$

7. The system as set forth in claim 1 wherein said smooth transition between a MAF sensor-dependent cylinder flow estimation method and a MAF sensor-independent cylinder flow estimation method is defined by the following equation:

$$y(t+\Delta)=y(t)+\Delta\cdot(-\gamma_1(y(t)-x(t))-\gamma_2(y(t)-z(t))-\gamma_3 sign(y(t)-z(t)))$$

an estimate of cylinder flow provided by a MAF sensor-independent method and z(t) is an estimate of cylinder flow provided by a MAF sensor-dependent method.

8. A method for estimating a cylinder flow in an internal combustion engine, the engine having a manifold airflow (MAF) and a manifold absolute pressure (MAP) sensor coupled downstream of it, the method comprising:

calculating a first cylinder flow estimate based on a MAF sensor-independent method;

providing an indication of an operating condition;

in response to said indication, providing a smooth transition between said first cylinder flow estimate and a second cylinder flow estimate based on a MAF sensor-dependent method, wherein said smooth transition is accomplished according to a predetermined switchover algorithm.

9. The method as set forth in claim 8 wherein said MAF sensor-independent flow estimation method is based on the following equation:

$$W_{cyl} = \eta_{vk}\frac{n_e}{2}V_d\frac{P}{RT}.$$

10. The method as set forth in claim 8 wherein said operating condition is a time since engine start-up.

11. The method as set forth in claim 8 wherein said operating condition is a temperature of the MAF sensor.

12. The method as set forth in claim 8 wherein said operating condition is achieved when an engine intake manifold pressure is sufficiently below atmospheric.

13. The method as set forth in claim 8 wherein said MAF sensor-dependent flow estimation method is based on the following equation:

$$W_{cyl} = \eta_{vk} \frac{n_e}{2} V_d \frac{P}{RT} + (\varepsilon - \gamma P) \frac{V_{im}}{RT}$$

where $\epsilon$ is adjusted as follows:

$$\dot{\varepsilon} = -\gamma\varepsilon - \gamma\eta_{vk} \frac{n_e}{2} V_d \frac{P}{V_{im}} + \gamma \frac{RT}{V_{im}} W_{th} + \gamma \frac{RT}{V_{im}} W_{egr} + \gamma^2 P.$$

14. The method as set forth in claim 8 wherein said predetermined switchover algorithm is defined by the following equation:

$$y(t+\Delta)=y(t)+\Delta\cdot(-\gamma_1(y(t)-x(t))-\gamma_2(y(t)-z(t))-\gamma_3 sign(y(t)-z(t)))$$

where x(t) is an estimate of cylinder flow provided by a MAF sensor-independent method and z(t) is an estimate of cylinder flow provided by a MAF sensor-dependent method.

15. A method for controlling an internal combustion engine, comprising:

calculating a first cylinder flow estimate based on a first estimation algorithm;

providing an indication of an operating condition;

in response to said indication, calculating a second cylinder flow estimate based on a second estimation algorithm; and providing a smooth transition between said first estimate and said second estimate by calculating a transitional cylinder flow value based on said first and said second cylinder flow estimates for a predetermined period of time.

16. The method as set forth in claim 15 wherein said first estimation algorithm is independent of a measured throttle flow.

17. The method as set forth in claim 15 wherein said second algorithm is dependent on a measured throttle flow.

18. The method as set forth in claim 15 wherein said operating condition is a time since engine start.

19. The method as set forth in claim 15 wherein said operating condition is a throttle position angle.

20. The method as set forth in claim 15 wherein said operating condition is an intake manifold pressure.

21. The method as set forth in claim 15 wherein said transitional cylinder flow value calculated based on said first estimate (x(t)) and said second estimate (z(t)) is defined by the following equation:

$$y(t+\Delta)=y(t)+\Delta\cdot(-\gamma_1(y(t)-x(t))-\gamma_2(y(t)-z(t))-\gamma_3 sign(y(t)-z(t))).$$

22. The method as set forth in claim 15 wherein said predetermined time is a time when a difference between said first estimate and said second estimate is less than a predetermined constant.

23. A method for controlling an internal combustion engine, comprising:

calculating a first cylinder flow value based on an estimated throttle flow;

calculating a second cylinder flow value based on a measured throttle flow; and smoothly transitioning between said first and said second values based on an operating condition, wherein said smooth transition is accomplished according to a predetermined switchover algorithm.

24. The method as set forth in claim 23, wherein said first cylinder flow value is calculated according to the following equation:

$$W_{cyl} = \eta_{vk} \frac{n_e}{2} V_d \frac{P}{RT}.$$

25. The method as set forth in claim 23 wherein said second cylinder flow value is calculated based on the following equation:

$$W_{cyl} = \eta_{vk} \frac{n_e}{2} V_d \frac{P}{RT} + (\varepsilon - \gamma P) \frac{V_{im}}{RT}$$

where $\epsilon$ is adjusted as follows:

$$\dot{\varepsilon} = -\gamma\varepsilon - \gamma\eta_{vk} \frac{n_e}{2} V_d \frac{P}{V_{im}} + \gamma \frac{RT}{V_{im}} W_{th} + \gamma \frac{RT}{V_{im}} W_{egr} + \gamma^2 P.$$

26. The method as set forth in claim 23 wherein said predetermined switchover algorithm is defined by the following equation:

$$y(t+\Delta)=y(t)+\Delta\cdot(-\gamma_1(y(t)-x(t))-\gamma_2(y(t)-z(t))-\gamma_3 sign(y(t)-z(t)))$$

where x(t) is said first cylinder flow value and z(t) is said second cylinder flow value.

27. The method as set forth in claim 23 wherein said first cylinder flow value is calculated according to the following:

$$W_{cyl} = \eta_{vk} \frac{n_e}{2} V_d \frac{P}{RT} + (\varepsilon - \gamma P) \frac{V_{im}}{RT}$$

where $\epsilon$ is adjusted as follows:

$$\dot{\varepsilon} = -\gamma\varepsilon - \gamma\eta_{vk} \frac{n_e}{2} V_d \frac{P}{V_{im}} + \gamma \frac{RT}{V_{im}} W_{th} + \gamma \frac{RT}{V_{im}} W_{egr} + \gamma^2 P$$

and $W_{th}$ is said estimated throttle flow.

28. The method as set forth in claim 23 wherein said second cylinder flow value is calculated according to the following:

$$W_{cyl} = \eta_{vk} \frac{n_e}{2} V_d \frac{P}{RT} + (\varepsilon - \gamma P) \frac{V_{im}}{RT}$$

where $\epsilon$ is adjusted as follows:

$$\dot{\varepsilon} = -\gamma\varepsilon - \gamma\eta_{vk} \frac{n_e}{2} V_d \frac{P}{V_{im}} + \gamma \frac{RT}{V_{im}} W_{th} + \gamma \frac{RT}{V_{im}} W_{egr} + \gamma^2 P$$

and $W_{th}$ is said measured throttle flow.

29. The method as set forth in claim 23 wherein said operating condition is a time since engine start.

30. The method as set forth in claim 23 wherein said operating condition is a throttle angle.

* * * * *